United States Patent Office 2,868,617
Patented Jan. 13, 1959

2,868,617
REMOVING HYDROGEN SULPHIDE FROM GASES

John E. Mills, Twickenham, England, assignor to The Gas Council, London, England, a British body corporate No Drawing. Application March 2, 1956
Serial No. 568,975

3 Claims. (Cl. 23—2)

This invention relates to a process for removing hydrogen sulphide from gases, more particularly, but not exclusively, from coal gas.

A process is known for removing hydrogen sulphide from gases, particularly coal gas, which consists in alternately washing the gases with a solution or suspension of an organic compound which will yield a readily oxidisable reduction product on contact with hydrogen sulphide, and bringing the solution or suspension containing the reduction product into contact with air or oxygen so that the reduction product is converted back to the original compound. The net effect of the process may be represented by the equation:

$$2H_2S + O_2 \rightarrow 2H_2O + 2S$$

Among the organic compounds proposed for use in the said process were certain organic dyes which are basic in character normally available in the form of salts, such as those of the azine, thiazine, oxazine and triphenylmethane classes, for instance methylene blue chloride, methylene violet and Meldola's blue. For such dyes a suitable solvent is aniline. With such dyes it was found that the presence of a catalyst was necessary to accelerate the reduction of the compound by hydrogen sulphide, the preferred catalyst then being an organic base such as pyridine or quinoline.

The present invention enables a process of this general kind to be conducted without a catalyst.

According to the present invention, a process for removing hydrogen sulphide from a gas comprises alternately washing the gas with a solution of a dye base which will yield a readily oxidisable reduction product on contact with hydrogen sulphide, and bringing the solution containing the reduction product into contact with air or oxygen to convert the reduction product back to the dye base.

The dye base can be made from any of the aforementioned basic dyes, the thiazine dyes being preferred. For instance, the dye base derived from methylene blue chloride may be made as follows:

To 100 cc. of a 4% solution of methylene blue chloride in aniline, 0.5 cc. of ammonia solution (S. G.=0.880) is added. Other aniline soluble bases may be used instead of ammonia. The solution is then reduced with an excess of hydrogen sulphide or other reducing agent, and extracted with an equal volume of water containing 5 cc. ammonia solution (S. G.=0.880) or other water-soluble base producing a water-soluble chloride (e. g. sodium carbonate) followed by a second extraction, and if necessary further extractions, to remove all chloride ions. The solution is then aerated or oxygenated to yield a solution of the methylene blue base.

The nature of the reactions taking place may conveniently be represented by the following formulae:

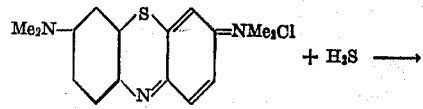
+ $H_2S \longrightarrow$

Methylene blue chloride

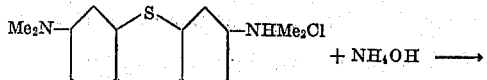
+ S

Leuco methylene blue chloride

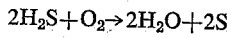
+ $NH_4OH \longrightarrow$

Leuco methylene blue chloride

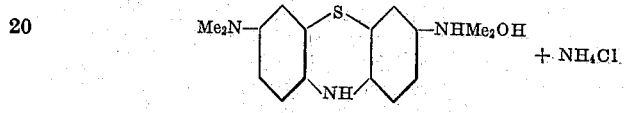
+ $NH_4Cl$

Leuco methylene blue base

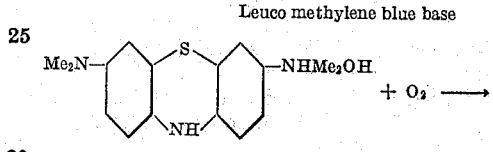
+ $O_2 \longrightarrow$

Leuco methylene blue base

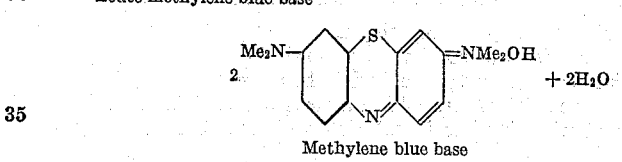
+ $2H_2O$

Methylene blue base

An alternative method of preparing the dye base from methylene blue chloride is as follows:

To 100 ccs. of a 2% aqueous solution of methylene blue chloride is added 0.5 cc. of ammonia solution (S. G.=0.880). The solution is then reduced with an excess of hydrogen sulphide and the leuco dye base is filtered off. This precipitate is washed with hydrogen sulphide water to remove the solution, hydrogen sulphide water being used to prevent oxidation of the leuco dye. The precipitate is then oxidised in air and dissolved in aniline to give a solution of methylene blue base. Other bases such as triethanolamine and sodium carbonate may be used instead of ammonia.

The reactions occurring during this method of preparation of the dye base are believed to be the same as before.

Similar procedures may be used for producing dye bases for the other dyes mentioned.

One specific example of the invention will now be described by way of illustration.

Coal gas containing 300 grains hydrogen sulphide per 100 cubic feet was passed through a laboratory absorber constituted by a glass bubbler containing a 2% solution of methylene blue base in aniline at the rate of 1 cubic foot per hour. The solution was circulated from this absorber to a combined gas-lift and oxidiser where oxygen at the rate of 0.5 cubic foot per hour was bubbled through the solution to oxidise it. From the oxidiser the solution was returned to the absorber. In this way 90–95% of the hydrogen sulphide was removed from the gas, whereas in the same apparatus using a solution of methylene blue chloride in aniline containing triethanolamine as the catalyst only 75–80% of the hydrogen sulphide was removed.

The hydrogen sulphide reduction step in the example may be represented, in a simplified form and ignoring any side reactions, as follows:

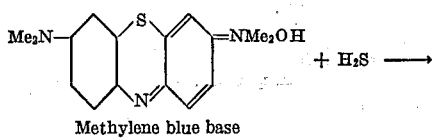

Methylene blue base

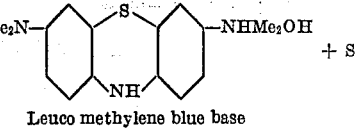

Leuco methylene blue base

The oxidation of the leuco methylene blue base to the methylene blue base is the same as that represented by the last equation given for the preparation of the methylene blue base.

This example shows that, in addition to the advantage of avoiding the need for a catalyst, the invention provides the further advantage of superior activity in hydrogen sulphide removal.

In the course of the process certain side reactions may occur leading to the formation of dye salts of sulphur oxyacids, e. g. oxysulphur salts of methylene blue in which oxysulphur radicals occupy the position of the chlorine atom in methylene blue chloride. Such salts of the sulphur oxyacids can easily be re-converted to the dye base by the same procedure as is used for preparing the dye base from the original dye salt. This can be done either by periodically carrying out the required treatment on the whole aniline solution or, preferably, by continuously or intermittently tapping off and treating a small proportion of the circulating solution. If a water-soluble catalyst were being used such treatment could not be carried out so simply, because the catalyst would go into the aqueous phase during the ammonia extraction.

The sulphur formed in the reaction is soluble in aniline and will circulate in solution until the solution is saturated. The sulphur can be forced out of solution at a suitable point in the cycle by passing the solution through a cooled bed of sulphur crystals, as described in co-pending Britist patent application No. 4,311/56.

Although the invention has been described primarily on a laboratory scale, it can readily be applied on an industrial scale.

What I claim as my invention and desire to secure by Letters Patent is:

1. A process for removing hydrogen sulphide from a gas containing hydrogen sulphide which comprises alternately washing said gas with a solution of a dye base comprising the product obtained by neutralization of the reduction product of a dye salt selected from the group consisting of the azine, thiazine, oxazine and triphenylmethane classes, whereby said dye base reacts with said hydrogen sulphide to produce a readily oxidizable reduction product, and bringing said solution containing said reduction product into contact with oxygen to convert said reduction product back to said dye base.

2. A process according to claim 1 in which said dye salt is methylene blue.

3. A process according to claim 1 in which dye salts of sulphur oxyacids are formed in said solution by side reactions and which includes the steps of converting said dye salts of sulphur oxyacids back to said dye base by treating said solution of said dye salts of sulphur oxyacids with a reducing agent and a base which forms a water-soluble compound with the sulphur oxyacids to produce said readily oxidisable reduction product, and oxidising said readily oxidisable reduction product to convert it into said dye base.

References Cited in the file of this patent

UNITED STATES PATENTS 1,972,074    Boswell _____ Sept. 4, 1934

FOREIGN PATENTS 693,278    Great Britain _____ June 24, 1953